United States Patent [19]

Takeuchi

[11] Patent Number: 4,709,250
[45] Date of Patent: Nov. 24, 1987

[54] IMAGE FORMING APPARATUS

[75] Inventor: Akihiko Takeuchi, Yokohama, Japan

[73] Assignee: Canon Kabushiki Kaisha, Tokyo, Japan

[21] Appl. No.: 829,754

[22] Filed: Feb. 14, 1986

[30] Foreign Application Priority Data

Feb. 19, 1985 [JP] Japan .................................. 60-31036
Feb. 19, 1985 [JP] Japan .................................. 60-31037
Feb. 19, 1985 [JP] Japan .................................. 60-31038
Feb. 19, 1985 [JP] Japan .................................. 60-31039

[51] Int. Cl.⁴ ...................... G03G 15/04; G01D 15/14
[52] U.S. Cl. .................................. 346/160; 355/14 E; 358/300
[58] Field of Search ................... 355/3 R, 14 R, 14 E, 355/14 C; 346/153.1, 160; 358/300, 302

[56] References Cited

U.S. PATENT DOCUMENTS

| | | | |
|---|---|---|---|
| 4,136,945 | 1/1979 | Stephens | 355/14 E |
| 4,212,530 | 7/1980 | Pitts | 355/14 R |
| 4,361,394 | 11/1982 | Sakai et al. | 355/14 E X |
| 4,387,983 | 6/1983 | Masegi | 355/14 E X |
| 4,551,005 | 11/1985 | Koichi | 355/14 E X |
| 4,573,787 | 3/1986 | Sanbayashi et al. | 355/14 E |

*Primary Examiner*—Fred L. Braun
*Attorney, Agent, or Firm*—Fitzpatrick, Cella, Harper & Scinto

[57] ABSTRACT

An image forming apparatus wherein the pulse width of an information signal for forming an information beam to be projected onto a photosensitive member is different depending on the image density of the image to be formed. An image density information of a latent image or a displayed image formed with the use of the information beam modulated in a reference signal is detected. In response to the result of the detection, the pulse width or the level of the information signal is controlled.

8 Claims, 7 Drawing Figures

IMAGE FORMING APPARATUS

FIELD OF THE INVENTION AND RELATED ART

The present invention relates to an image forming apparatus wherein an electrophotographic photosensitive member is exposed to light modulated in accordance with a modulation signal corresponding to the information to be recorded, so that the corresponding image is formed.

When an image is formed only with two levels, i.e., a white level picture element having the minimum area-average image density and a black level picture element having the maximum area-average image density, that is, with the non-half-tone picture element, it is difficult to form an image having good resolution and half-tone faithfullness. Therefore, it has been considered to employ a half-tone picture element having an area-average image density between that of the white level picture element and that of the black level picture element, so as to provide and half-tone image using the half-tone picture element.

As one method for forming the half-tone picuture element, the period of exposure of the photosensitive member to the light per one picture element is reduced as compared with that of the black level picture element (high-image density picture element) or that of the white level picture element (low image density picture element). In this method, the pulse width of the signal for modulating the light is modulated (pulse width modulating method). However, a so-called characteristic curve representing the characteristic of the electrophotographic photosensitive member (V-D curve representing the relation between the surface potential V of the photosensitive member and a density D of the developed image, or E-D curve representing the relation between the amount of exposure of the photosensitive member E and the density D of the developed image), is steep in the half-tone area, with the result that when the output intensity of the light source varies, or when the sensitivity of the photosensitive member varies, the image quality of the halftone image is more easily disturbed than the balck level image or a white level image, and therefore, the quality of the entire image is degraded.

SUMMARY OF THE INVENTION

Accordingly, it is a principal object of the present invention to provide an image forming apparatus of a pulse width modulating type with improved image quality.

It is a further object of the present invention to provide an image forming apparatus of a pulse width modulation type by which the quality of the half-tone image is improved.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
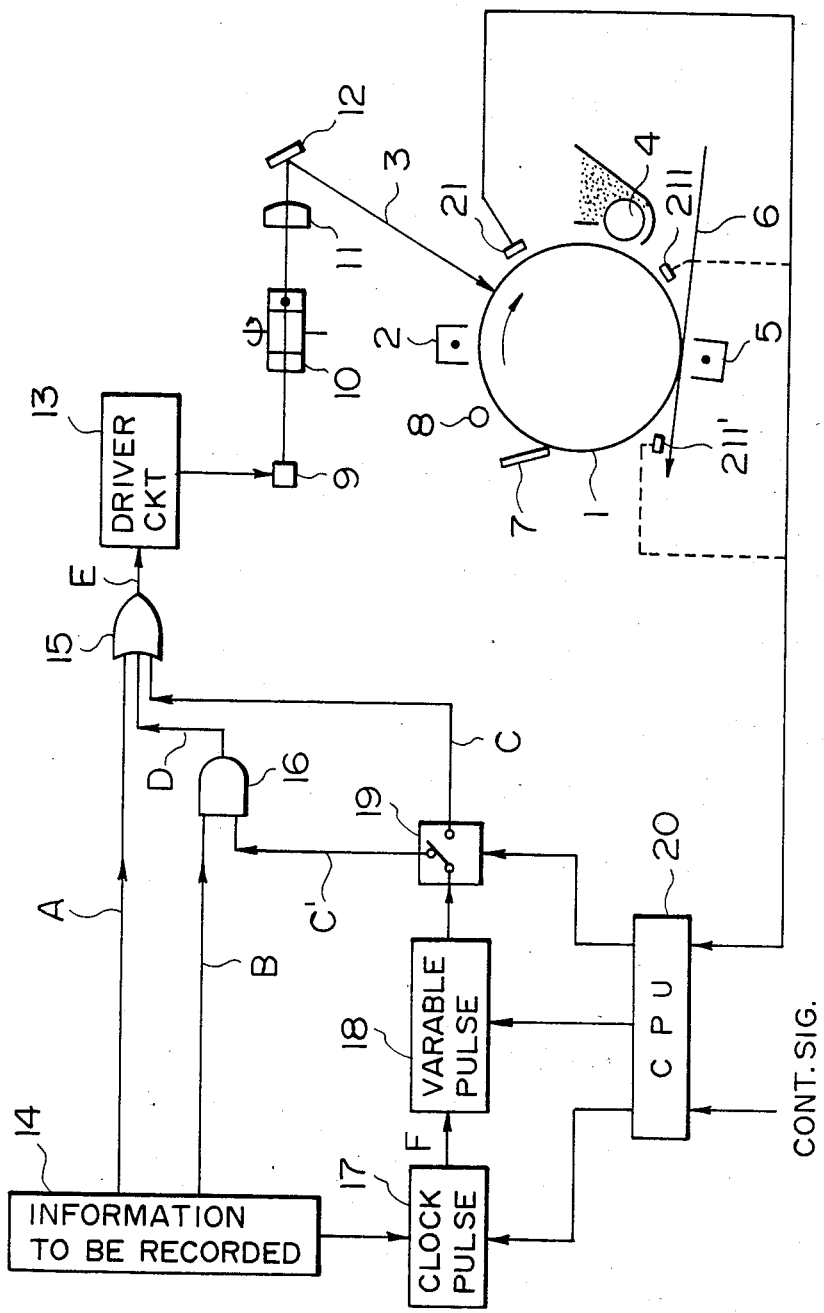
FIG. 1 is a sectional view of the image forming apparatus according to an embodiment of the present invention.

Referring to FIG. 1, there is shown an image forming apparatus according to an embodiment of the present invention. The apparatus comprises a rotatable electrophotographic photosensitive member 1 in the form of a drum rotatable in the direction indicated by an arrow. The photosensitive member 1 is uniformly charged by a charger 2 and is scanned, and therefore, exposed to a laser beam 3 which is on-off modulated in accordance with modulation signals and which is deflected in the direction substantially perpendicular to the movement of the periphery of the photosensitive member 1. By this exposure, an electrostatic latent image is formed on the photosensitive member 1, and the latent image is developed by the developing device 4. In this embodiment, the developing device 4 effects so-called reversal development wherein the light area of the photosensitive member 1 which has been exposed to the laser beam 3 receives the toner particles. Such a developing device is known. The toner particles applied to the photosensitive member 1 by the developing device 4, are therefore, electrically charged to the same polarity as the polarity to which the charger 2 charges the photosensitive member 1. In other words, the laser beam 3 is effective to expose such a part of the photosensitive member 1 as to receive the toner particles. The laser beam 3 is modulated to effect this.

In any event, the developed image on the photosensitive member 1 is tranferred onto a transfer material 6 by a transfer charger 5. The developed toner image transferred onto the transfer material 6 is fixed by a unshown fixing device. On the other hand, the toner particles which have not been transferred onto the transfer material are removed by a cleaner 7 so that the residual toner is removed from the photosensitive member 1. Thereafter, the electric charge remaining on the photosensitive member 1 is removed by a discharging lamp, so that the photosensitive member is prepared for the next image forming operation.

The laser beam 3 is emitted from a semiconductor laser 9. The semiconductor laser 9 is driven by a driver circuit 13 to which the modulation signal E is applied to produce a laser beam 3 which is on-off modulated in accordance with the modulation signal E. When an image is formed on the photosensitive member 1 in accordance with the information to be recorded (image formation mode), the modulation signal E is a signal corresponding to the information to be recorded. The laser beam 3 emitted from the semiconductor laser 9 scans the surface of the photosensitive member 1 by way of a scanner 10 which may comprise a rotatable polygonal mirror, a galvano mirror or the like. The apparatus further comprises a lens 11 for imaging the laser beam 3 as a dot on the photosensitive member 1 and a mirror 12 for directing the optical path.

In the image forming mode, if the image to be formed contains a black level portion and a half-tone level portion, the modulation signal applied to the driver circuit 13 contains in time series the modulating signal corresponding to the black level and the modulation signal corresponding to the half-tone level. In the embodiment of FIG. 1, the black level signal A, which is transmitted from an information source 14 such as a computer, a word processor, an image reading device, an information memory or the like, is applied to the driver circuit 13 through an OR gate 15. On the other hand, the half-tone signal B from the information source 14 is applied to an AND gate 16. To this AND gate 16, a pulse signal C' is applied, the pulse signal C' having the pulse width (time length) controlled and set in a control mode which will be described hereinafter. Therefore, when a half-tone signal B exists in the information signals to be recorded, the pulse signal C' as a modulation signal D (pulse signal) corresponding to the half-tone, is passed through the AND gate 16 and is applied to OR gate 15.

Figure 2:
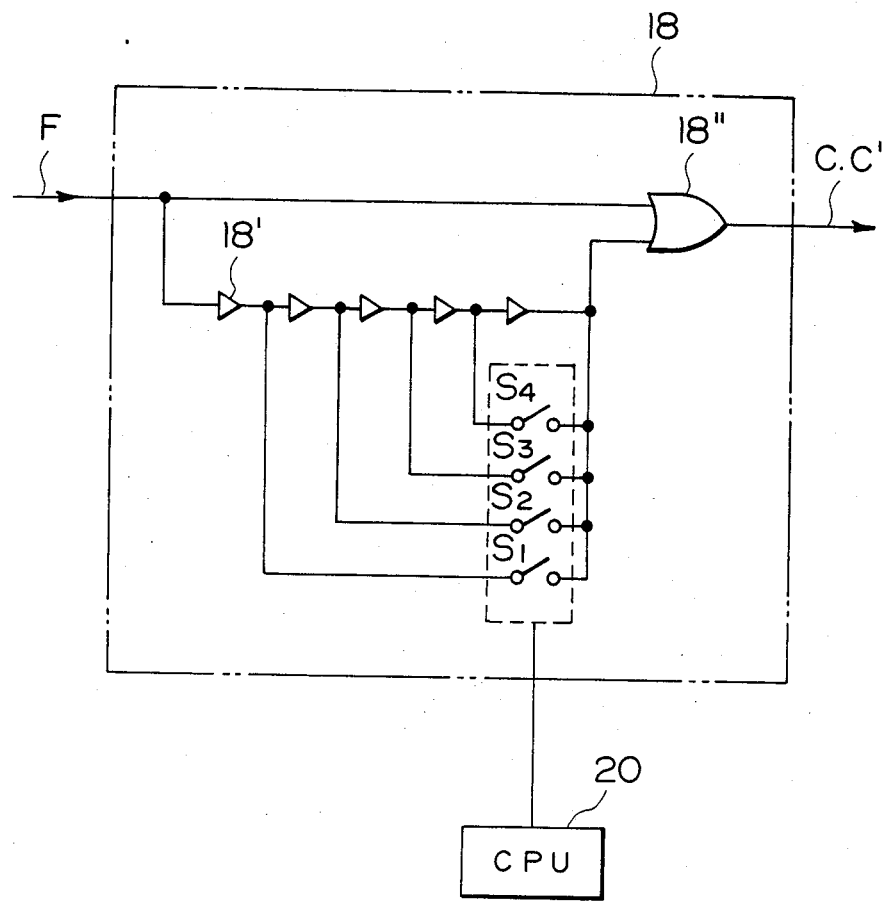
FIG. 2 shows an example of a circuit for changing the width of a pulse.

The above-described pulse signal C' and a reference modulation signal C which will be described hereinafter are produced by a variable pulse generating circuit 18 to which clockpulses F (for example, 18 MHz) are applied from a clockpulse generator 17. The clockpulse generator 17 outputs clockpulses F in synchronism with output of the signals A and B from the information source 14 in the image forming mode; and outputs clockpulses F on the basis of a command from a control microcomputer 20 (a central processing unit) in the control mode. A variable pulse generator 18 uses said clockpulses to produce pulse signals having various widths (the pulse width for one picture element is changed). As for the variable pulse generating circuits, a known one may be used, for example, the circuit as shown in FIG. 2 utilizing the delaying period of a TTL (transistor-transistor-logic). In FIG. 2, the clockpulse F is applied to the OR gate 18'' and introduced to the series of the TTL 18'. By selectively closing the switches S1, S2, S3 and S4, the width of the pulse produced by the OR gate 18'' is selected. Here, the width T1 (pulse continuing period) of the output pulse of the OR gate when the switch S1 is closed, the width A2 when the switch S2 is closed, the width T3 when the switch is closed, the width T4 when the switch S4 is closed and the width T5 when all of the switches are closed, satisfy:

$$T1 < T2 < T3 < T4 < T5 < T0$$

The selective actuation of the switches S1, S2, S3 and S4 are controlled by the microcomputer 20. Here, the width T0 is the pulse width of the black level signal corresponding to one picture element of a black level image.

In this embodiment, the pulse signal having its width T3 formed by the circuit 18 is used also as a reference modulation signal in the control mode which will be described hereinafter, that is, the picture element signal for a reference image formation. When the pulse width of the half-tone modulation signal to be used in the image forming mode is determined to be T3 in the control mode, it is used also as the half-tone modulation signal (that is, the picture element signal for the half-tone image formation) in the image forming mode. By using one variable pulse generating circuit both in the control mode and the image formation mode, the apparatus is simplified. However, this is not limiting, and it is possible that the variable pulse generating circuit is exclusively used for the image formation mode, so that a reference modulation signal forming circuit is employed exclusively for the control mode. As for the reference modulation signal, it is preferable that the reference signal has a pulse width which results in a desired and predetermined half-tone image density when the visible image is formed therewith under the condition that the output intensity of the laser, the sensitivity of the photosensitive member, the property of the developing device and others are in standard states, since then more accurate control is assured in the control mode. Therefore, it is preferable in the followind embodiments that the modulation signal having such a pulse width is used as a reference modulation signal. However, this is not always necessary. For example, a signal having another pulse width may be used as the reference modulation signal if the pulse width thereof is shorter than the pulse width for one picture element of the black level modulation signal. This is because there is a predetermined relationship between any pulse width and the pulse width of the modulation signal required to provide a desired half-tone image density.

In the FIG. 1 embodiment, the control mode operation is performed prior to the image forming mode operation. In the control mode, the photosensitive member 1 rotates, and the charger 2 operates, and in addition, the scanner 10 rotates. However, the developing device 4, and the transfer charger 5 may or may not be operated. It is preferable that the discharging lamp 8 operates.

In the control mode, when a control signal is transmitted to the microcomputer (CPU) 20, the microcomputer 20 actuates the switching circuit 19 so that the output of the variable pulse generating circuit 18 is directly transmitted to the OR gate 15, i.e., not through the AND gate 16. The microcomputer 20 closes the switch S3 of the variable pulse generating circuit 18, while actuating the clockpulse generating circuit 17 to apply the clockpulse F to the circuit 18. By this, a pulse signal C (reference modulation signal) having the pulse width T3 described above is produced by the cicuit 18, and then the signal C is applied to the driving circuit 13 by way of the OR gate 15. By this, the laser 9 is on-off modulated and driven in accordance with the signal C, and the modulated laser beam 3 is scanned across the photosensitive member 1. The surface potential V of the photosensitive member 1 thus scanned (the potential V of a sample latent image formed with the use of the signal C) is detected by a potential sensor 21 disposed opposite to the photosensitive member 1 after the exposure station. In response to the representative surface potential of the photosensitive member 1 thus detected, the microcomputer 20 selects the modulation pulse width for forming the half-tone image having the desired density. Since the surface potential of the electrostatic latent image corresponds to the image density of the developed image produced by developing the same latent image, the surface potential is one of the density information of the image.

In this embodiment, the information of the surface potential V is taken into RAM of the microcomputer 20 and stored therein.

Subsequently, the microcomputer 20 discriminates whether or not the absolute value of the difference between the detected voltage V and the aimed half-tone potential $V_H$ (the surface potential of the photosensitive member (the electrostatic latent image) which provides the predetermined half-tone density after development)

is ΔV or lower. In other words, the determination is made as to whether or not the potential of the sample latent image comes within the deviation tolerance of the aimed potential. If the result is affirmative, that is, if the deviation is within the tolerance, the density of the half-tone image produced by the laser beam modulated by the modulation signal having the pulse width T3, deviates from the aimed half-tone density within the tolerance. Therefore, the application of the clockpulse F to the circuit 18 is stopped, and the switch 19 is changed to the side of the AND gate 16, thus terminating the control mode. The tolerance ΔV is determined corresponding to the required accuracy with respect to the half-tone density, in consideration of the property of the photosensitive member, the preset aimed potential $V_H$, the charged potential by the charger 2, the property of the developing device and the like.

If, on the other hand, $|V-V_H|$ is larger than ΔV, the microcomputer 20 determines a target pulse width $T_H$ in accordance with a formula stored in the ROM 20 thereof, which is:

$$T_H = T3 + a(V - V_H)$$

The target pulse width $T_H$ is the pulse width which will provide the surface potential of the latent image which is equal to or near said aimed potential when the electrostatic latent image is formed on the photosensitive member with the use of the modulation signal having the target pulse width. The value a is a constant determined in accordance with the characteristics of the photosensitive member, the developing device and the laser, the width T3 of the reference modulation signal, the position of the target half-tone potential $V_H$ on the V-D curve or δ characteristics curve, or the like. The constant a is determined by one skilled in the art through experiments.

The target pulse width $T_H$ is not always equal to one of the pulse widths T1-T5 which are selectable. In the embodiment of FIG. 1, the pulse width closest to the width $T_H$ is selected from the widths T1-T5 as the pulse width of the half-tone modulation signal (the pulse width of the half-tone picture element signal) in the subsequent image forming mode. By doing so, the half-tone image having a density which varies only within the tolerance with respect to the predetermined half-tone density can be provided. The microcomputer 20 stops application of the clockpulse F to the circuit 18, and selects the switch which can produce the pulse having the width nearest to the width $T_H$ from the switches S1-S4 of the variable pulse generating circuit 18 and closes the same. When the width $T_H$ is closest to the width T5, the microcomptuer 20 closes all of the switches S1-S4. The microcomputer 20, after selective actuation of the switches S1-S4, actuates the switch 19 so as to switch the signal line so that the output (pulse signal C') of the variable pulse generating circuit 18 is transmitted to the OR gate 16. Thus, the control mode operation ends.

Figure 3:
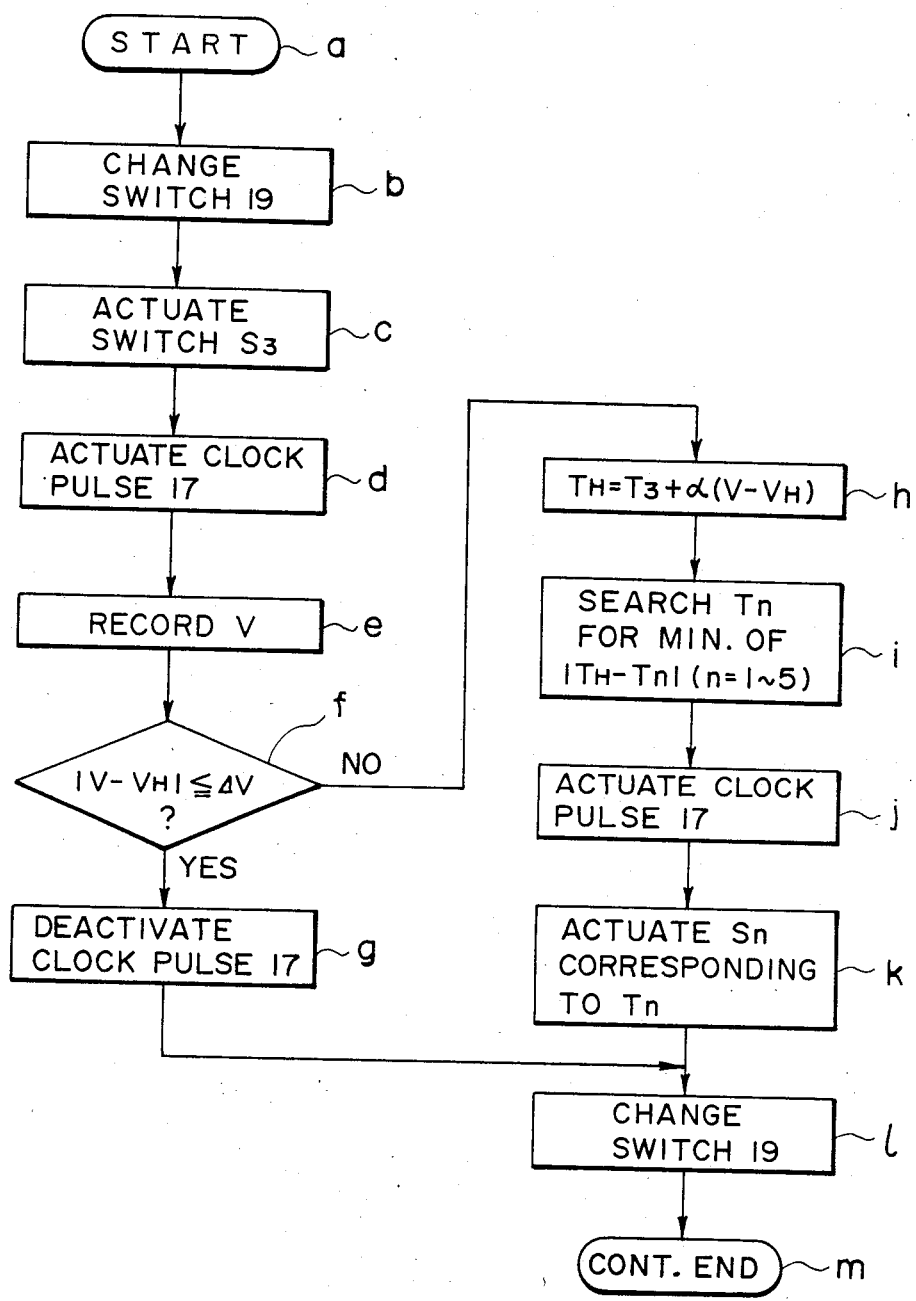
FIG. 3 is a flow chart illustrating the control of the FIG. 1 embodiment.

FIG. 3 is a flow chart illustrating the operation of the microcomputer 20 in the control mode. The formula at the step h is not limited to the above described. For example, the width $T_H$ may be determined by the following formula:

$$T_H = aT3(V/V_H)$$

where a is constant. Further preferable formulas may be obtained through experiments. The potential compared with the detected potential V is not limited to the target potential $V_H$, but it may be any proper one. This is because there is a predetermined relationship between any proper one and the target potential $V_H$. What is required is that the pulse width of the modulation pulse signal for forming the half-tone image to be recorded is controlled in accordance with the reference between the detected potential V of a sample latent image and a predetermined reference level. When the control mode ends, the image forming mode operation starts after the image formation instructions (print instructions) are produced immediately after the end of the control mode or with a certain delay.

The operation of the control mode may be performed interrelatedly with the operation of actuating the power source switch (main switch) of the apparatus; may be performed interrelatedly with actuation of the image forming mode operation instructing switch (print switch); or may be performed between the time when one transfer material is fed and the time when the subsequent transfer material is fed, that is, the time period between adjacent paper feedings (the time period existing between a termination of the laser beam application to the photosensitive member for one image and start of the laser beam application thereto for the next image). Alternatively, it is possible that a test area is provided on the photosensitive member, which is outside, in the direction of the laser beam scan, of the area in which the image to be transferred is formed, and that the sample image is formed in the test area, on the basis of which the above-described control operation is effected. In this case, the laser beam modulated in accordance with the signal C scans the above-described test area before or after one line scan of the laser beam which is modulated by the modulation signal corresponding to the image to be recorded. Therefore, the control mode and the image formation mode are performed in parallel.

Figure 4:
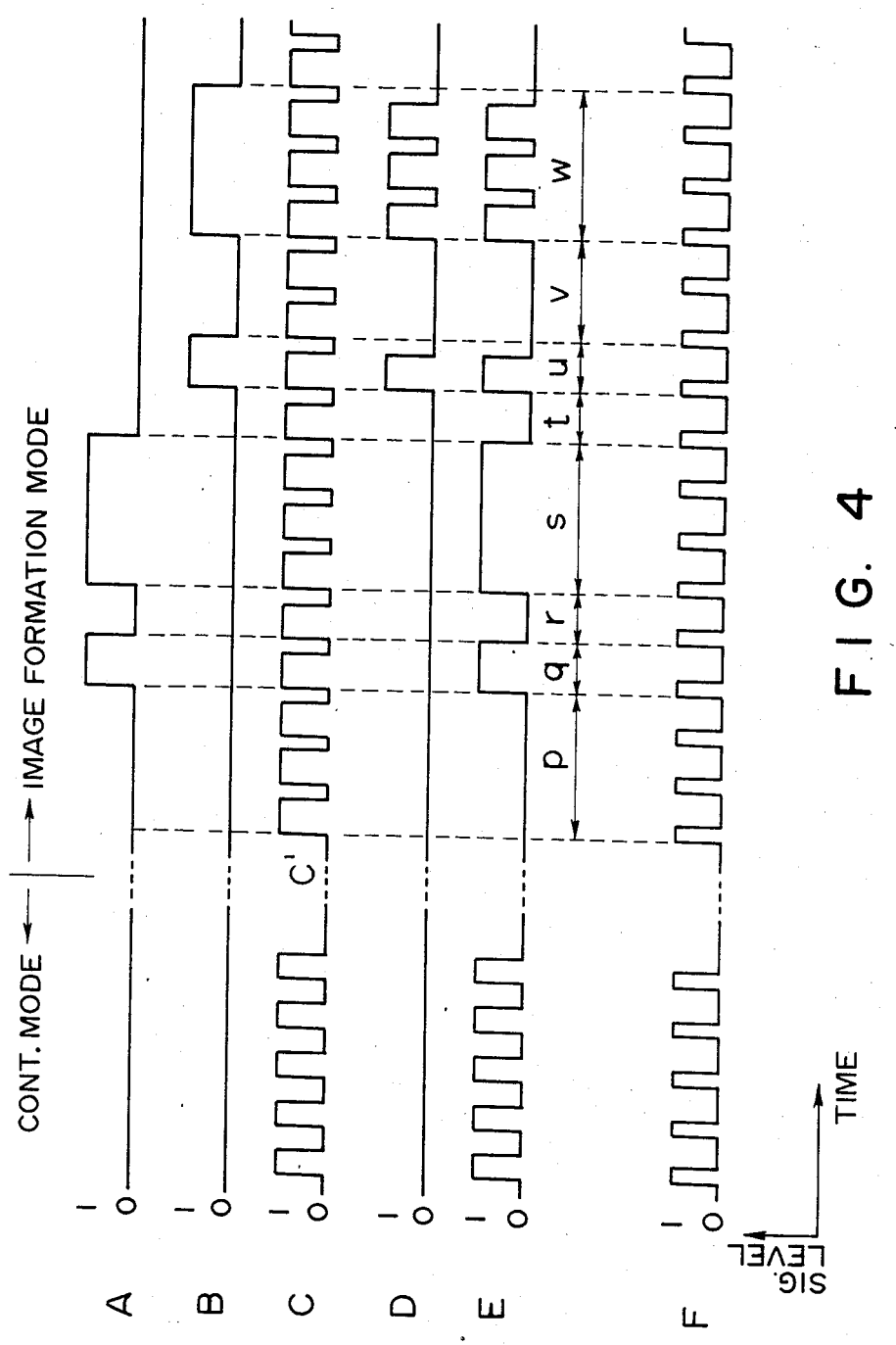
FIG. 4 illustrates signals in the FIG. 1 embodiment.

FIG. 4 is an example of a time chart for the above-described signals A-E. In this Figure, the left side represents the control mode, while the right side represents the image forming mode. The semiconductor laser 9 renders on when the level of the signal E is 1. The period p is a white level image portion having three picture elements; the periods r and t are white level image portion of one picture element, respectively; the period v is a white level image portion of two picture elements; the period q is a black level image portion of one picture element; the period s is a black level image portion of three picture elements; the period u is a half-tone image portion of one picture element; and the period w is a half-tone image portion of three picture elements.

In the foregoing embodiment, the potential of the latent image is used as the information representing the density of the sample image. However, a reflective density of a displayed sample image which is provided by developing the sample latent image may be detected so as to control the modulation signal in accordance with the result of detection. This is preferable when it is predicted that the developing property of the developing device varies. In this case, the developing device 4 is operated in the control mode, too.

In FIG. 1, designated by a reference numeral 211 is a reflective desnity sensor disposed opposite the photosensitive member at a position after the developing station. The density sensor 211 includes a light source, a photosensor for receiving the light reflected by the object illuminated by the light source and for producing an electric signal in accordance with the amount of light received thereby.

In the control mode, the photosensitive member 1 is exposed to the laser beam 3 modulated in accordance with the reference modulation signal, similar to the above-described case. The latent image thus formed in developed by the developing device 4. The reflective image density D of the sample developed image is detected by the sensor 211. The information of the detected density D is transmitted to the microcomputer 20 in place of the potential information V, and a similar control operation is performed. More particularly, the formula used in the step f of the flow chart of FIG. 3 is replaced by:

$$|D-D_H| \leq \Delta D$$

where $D_H$ is the reflective image density of the target half-tone image, $\Delta D$ is a tolerance of the absolute value of the difference between the sample image density D and the target image density $D_H$. Further, the formula at the step h is replaced by:

$$T_H = T3 + a(D - D_H)$$

Here, the formula at step h may be:

$$T_H = aT3(D/D_H)$$

Similar to the first embodiment, what is compared with the detected density D is not limited to is the target density $D_H$, but may be a proper value for the same reason. What is required is that the width of the modulation pulse signal for forming the half-tone image to be recorded is controlled in accordance with the difference between the image density D of the sample developed image detected and a predetermined reference density. Usually, at the marginal area of the transfer material, there is a blank area where no image is formed corresponding to the information to be recorded. Taking the benefit of the blank area, it is possible that a sample displayed toner image formed with the reference modulation signal is transferred onto the blank area of a transfer material by the transfer charger 5, and that the image density D of the transferred image is detected on the transfer material 6 by a density sensor 211', the sensor 211' being adapted to be opposed to a transfer material. In this case, the operation of the control mode and that of the image forming mode may be peformed in parallel. In the case where the sample displayed image is formed on the transfer material 6, and then the image density thereof D is detected by the sensor 211', it is possible that the control mode operation is carried out independently of the image forming mode before or after the image forming mode operation. In this case, the sample displayed image may be formed at any part of the transfer material 6.

Also in the case where the reflective image density of the visualized sample image is detected in the control mode, and the pulse width of the half-tone image signal is controlled in accordance with the detection, such signals as shown in FIG. 4 are obtained.

In the foregoing embodiments, there is one half-tone level between the white level and the black level. Two or more half-tone levels may be provided. In this case, the control mode operation is such that the control operation is effected for each of the half-tone levels, so that a proper pulse width is determined for each of the modulation signals for the half-tone levels. Otherwise, it is possible that a sample image is formed by exposing the photosensitive member to a laser beam modulated common reference modulation signal. Proper pulse widths for the respective modulation signals for the half-tone levels may be determined in response to the surface potential or the reflective image density of the sample image. In the latter case, the respective pulse widths may be controlled in response to the difference between the detected potential or the image density and the common reference potential or image density; or may be controlled in response to the difference between each of the reference potentials or image densities inherent to the half-tone levels and the detected potential or image density.

In the foregoing embodiments, the information beam is controlled by controlling the pulse width of the half-tone picture element signal.

Figure 5:
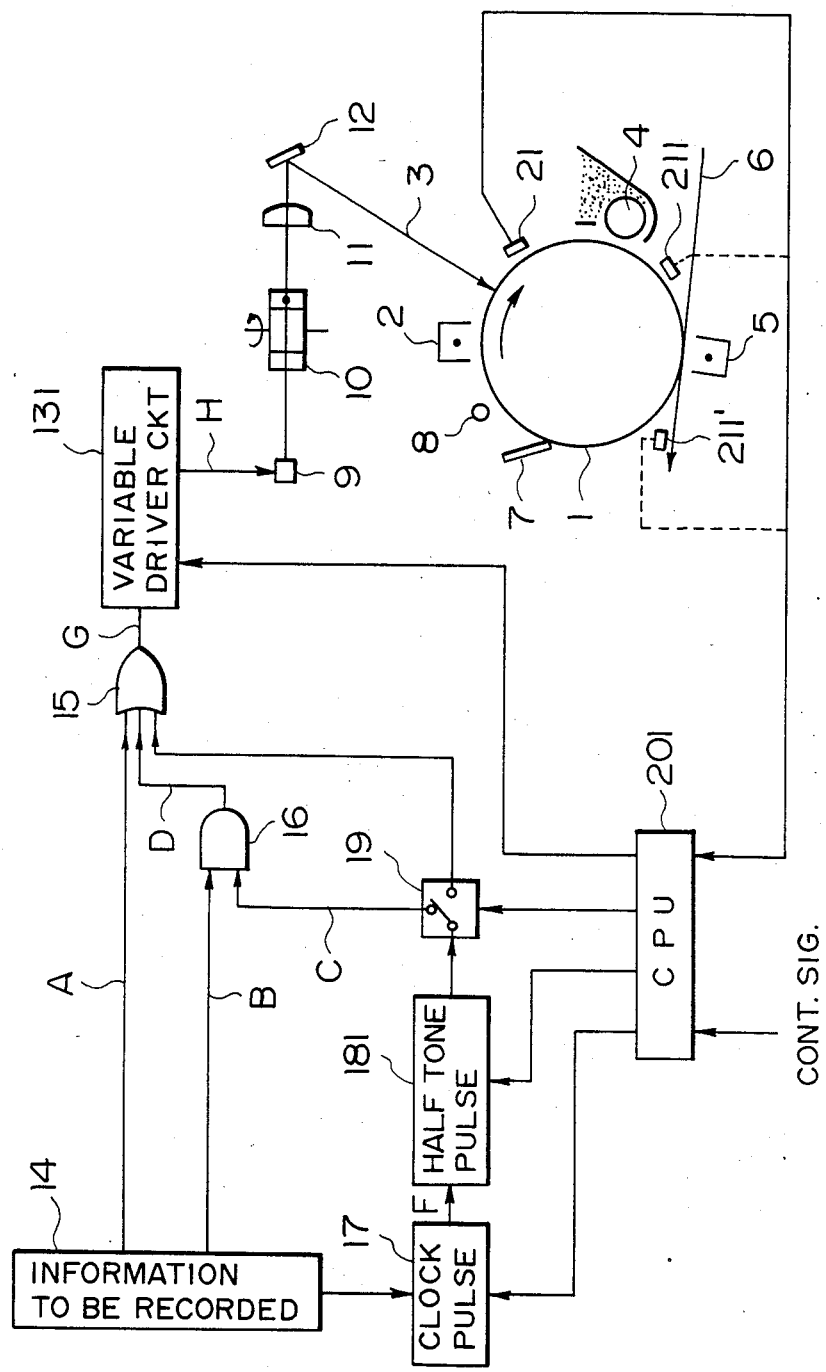
FIG. 5 is a sectional view of an image forming apparatus according to another embodiment of the present invention.

FIG. 5 illustrates another embodiment of the present invention wherein the intensity of the information beam is controlled. This is suitable when it is predicted that the characteristics of the output of the semiconductor laser varies with time. In FIG. 5, the same reference numerals are assigned to the elements having the same functions as with FIG. 1, and the detailed descriptions thereof are omitted for the sake of simplicity of explanation.

The laser beam 3 is emitted from the semiconductor laser 9. The semiconductor laser 9 is driven by an output current H (corresponding to the signal G) of the variable output driving circuit 13 to which the modulation signal G is applied. The laser beam which is on-off modulated in response to the modulation signal G is emitted, and the intensity of the beam corresponds to the level of the current H. The variable output driving circuit 131 contains therein a variable resistor or the like so as to change the level of the output current H. When an image is formed on the photosensitive member 1 corresponding to the information to be recorded (the image forming mode), the modulation signal G corresponds to the information to be recorded. In the image forming mode, the driving current H which is the output of the circuit 13 contains in time series current pulses corresponding to the black level current and the half-tone level current.

In FIG. 5, a half-tone pulse generating circuit 181 is sued in place of the circuit 18 of FIG. 1. The circuit 181 uses the clockpulses generated by the clockpulse generating circuit 17 to produce a pulse signal having a predetermined pulse width, for example, approximately a half of the pulse width of one picture element for the black level signal. As an example of this, a TTL (transistor-transistor-logic) may be used utilizing the delay period thereof. The pulse signal produced by the circuit 181 is, in this embodiment, used as a reference modulation signal in a control mode operation which will be described hereinafter, and as a half-tone modulation signal in the image forming mode. Similar to the foregoing cases, it is possible to provide a reference modulation signal generating circuit exclusively for the control mode. Also, similarly to the foregoing embodiments, the reference modulation signal preferably has a pulse width with which the predetermined and desired half-tone density of the image is provided when the displayed image is formed under the condition that the laser output intensity, the sensitivity of the photosensitive member and the like are in standard states. Similar to the foregoing cases, a signal having any pulse width can be used as the reference modulation signal if the pulse width is shorter than the pulse width of the black level modulation signal for one picture element.

The description will be made as to the control mode in the FIG. 5 apparatus. When a control signal is introduced into the microcomputer (CPU) which is a central processing unit, the microcomputer 201 actuates the switching circuit 19 so that the output of the half-tone pulse generating circuit can be directly transmitted to the OR gate 15, that is, not through the AND gate 16. The microcomputer 201 operates the clock-pulse generating circuit 17 so that the clockpulse F is applied to the circuit 181. By this, the pulse signal C (the reference modulation signal) is produced by the circuit 181. The signal C is applied to the driving circuit 131 by way of the OR gate 15. On the other hand, the microcomputer 201 sets the level of the output current (modulation current) of the driving circuit 131 to Is. Then, the laser 9 is on-off modulated by the driving current H having the current level Is corresponding to the signal C, whereby the laser beam 3 having the intensity corresponding to the current level Is scans the photosensitive member 1. The surface potential Vs of the photosensitive member 1 thus exposed (that is, the potential Vs of a sample half-tone latent image) is detected by a potential sensor 21. The microcomputer 201, in response to the surface potential of the photosensitive member thus detected, selects a current level, and therefore the intensity of the imaging light, of the driving current H for forming the half-tone image having the predetermined density. It will be understood that the potential Vs represents image density information.

The information of the potential Vs is taken into the RAM of the microcomputer 201 and stored therein. The microcomputer 201 uses the stored potential Vs to determine the current level Ip for image forming mode in accordance with the formula stored in the ROM of the microcomputer, which is:

$$Ip = Is + a(Vs - V_H)$$

where $V_H$ is the potential of the latent image which provides the predetermined half-tone image density after development, in other words, a target half-tone potential, and a is a constant determined in accordance with the property of the laser, the property of the photosensitive member, the pulse width of the reference modulation signal, the position of the target potential $V_H$ on the V-D curve (γcharacteristics) and the like. The constant may be determined by one skilled in the art through experiments. By driving the laser 9 with the driving current having the level Ip, the predetermined half-tone image can be provided. Also, since the black level image is formed by the laser driven by the driving current H having the current level Ip, the resolution of the image is improved. The microcomputer 201, after determining the current level Ip, stops the application of the clockpulse F to the half-tone pulse generating circuit 18, and changes the resistance of the variable resistor in the variable driving circuit 13 so as to enable output of the driving current having the current level Ip, and further actuates the switch 19 so that the output (pulse signal C) of the variable pulse generating circuit 181 is transmitted to the OR gate 16. Thus, the control mode operation ends.

Figure 6:
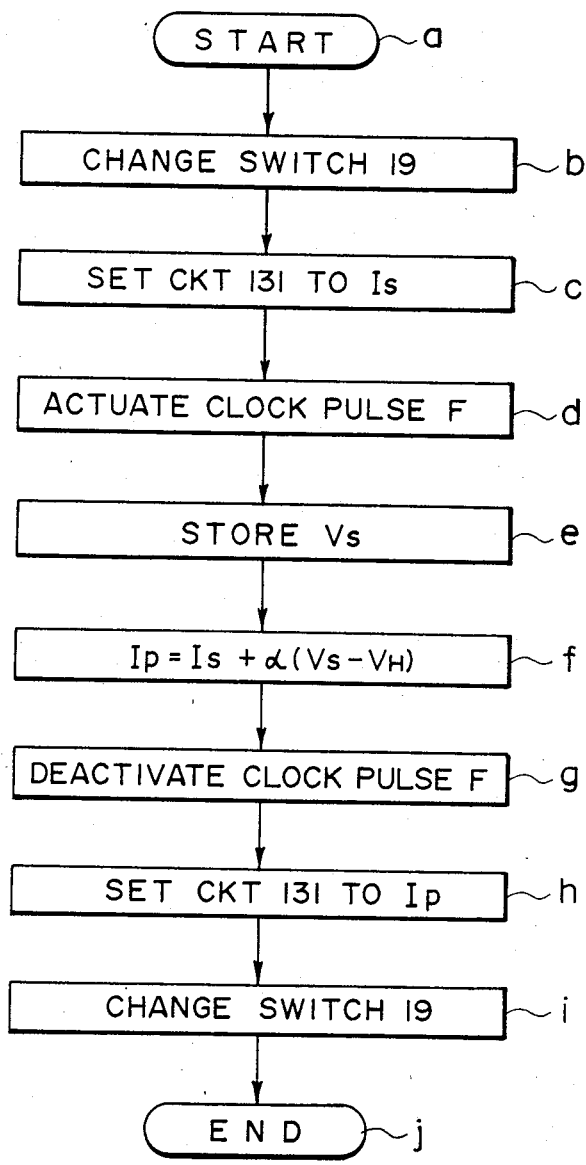
FIG. 6 is a flow chart illustrating the control of the FIG. 5 embodiment.

FIG. 6 is a flow chart illustrating the operations of the microcomputer 201 in the control mode. The formula in the step f of FIG. 6 is not limited as described above. For example, the formula may be:

$$Ip = aIs(Vs/V_H)$$

where a is a constant. Other preferable formulas may be determined through experiments by one skilled in the art. What is compared with the detected density Vs is not limited to be the target potential $V_H$, but other proper value may be used. This is because there is a predetermined relation between any proper value and the target potential $V_H$. It is preferable that the reference current Is is determined such that when the property of the laser and the property of the photosensitive member are standard, a sample half-tone latent image having the target potential $V_H$ is formed by the laser driven by the current level Is, since then accurate control is assured. However, it is possible to use another value as the reference current Is. This is because there is a predetermined relationship between the potential $V_H$ and the potential of the half-tone latent image provided by the another value.

What is required is that the intensity of the imaging light for forming the image to be recorded is controlled so as to provide the desired half-tone image density in response to the difference between the image density of the sample half-tone latent image and the predetermined reference level.

Similarly to the foregoing embodiments, the image forming mode operation starts upon generation of the image forming instruction signal (printing signal) which may be generated immediately after the end of the control mode operation or with a time delay thereafter, similar to the foregoing embodiment. With respect to the time during which the control mode operation is effected an the portion of the photosensitive member used for the control mode operation, the same as with the FIG. 1 embodiment applies to the FIG. 5 embodiment.

Figure 7:
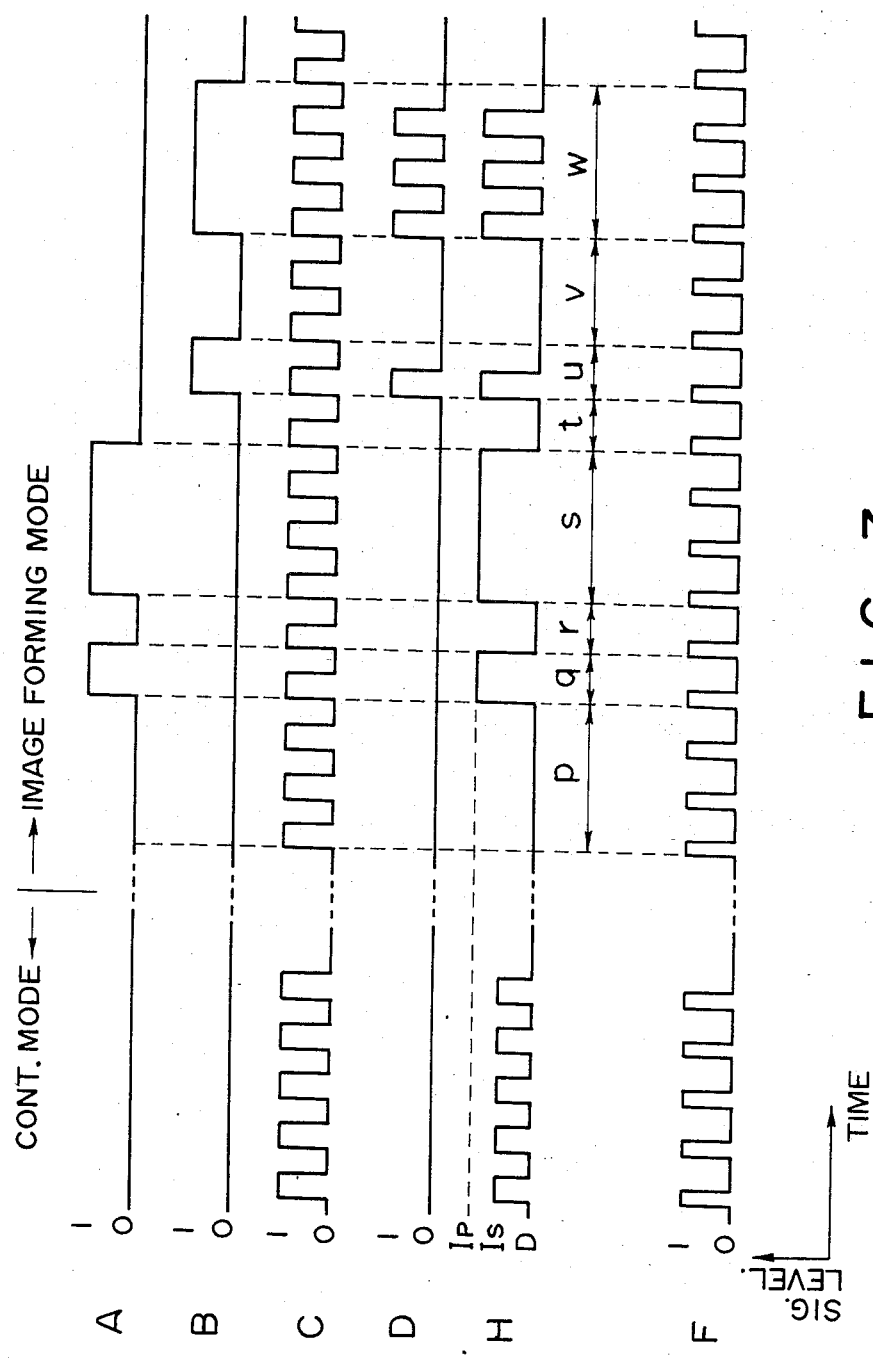
FIG. 7 illustrates signals in the FIG. 6 embodiment.

FIG. 7 is an example of a time chart representing the signals A–D, H, F. In this Figure, the left side represents the control mode, while the right side represents the image forming mode. The unshown signal G is readily obtained by making the levels of signal H equal at the left and right sides. The semiconductor laser 9 renders on when the signal H (driving current) is higher than the zero level (Is, Ip). In this Figure, the period p is a white level image portion of three picture elements; the periods r and t are white level image portions of one picture element, respectively; the period v is a white level image portion of two picture elements; the period q is a black level image portion of one picture element; the period s is a black level image portion of three picture elements; the period u is a half-tone image portion of one picture element; and the period w is a half-tone image portion of three picture elements. As will be understood, the black level signal, as well as the half-tone signal, is controlled to be the same level as the half-tone signal.

It is a possible alternative in the FIG. 5 embodiment that the reflective image density is detected of a displayed sample image, and the intensity of the information beam is controlled in response to the detection. In this case, similar to FIG. 1 embodiment, the reflective image density sensor 211 or 211' is used. The reflective image density Ds of the displayed sample half-tone image on the photosensitive member or on the transfer material is transmitted to the microcomputer 201. The microcomputer 201 operates in this case, also, in accordance with the flow chart shown in FIG. 6. In this case, however, the formula in the step f of FIG. 6 is:

$$Ip = Is + a(Ds - D_H)$$

where $D_H$ is the target half-tone image density.

Or, the same formula may be replaced by:

$$Ip = aIs(Ds/D_H)$$

Another formula may be used. As will be understood from the foregoing, what is compared with the detected density Ds is not limited to be the target density $D_H$, but it may be another proper value or level. It is preferable that the reference current Is is determined such that when the displayed sample half-tone image having the target image density $D_H$ is formed by the laser beam driven by the reference current Is under the condition that the property of the laser and the property of the photosensitive member are standard. This is because the accurate control is assured. However, another level may be used as the reference current Is. What is required is that the intensity of the imaging beam for forming the image to be recorded is controlled so as to provide the desired half-tone image density in response to the difference between the image density of the visualized sample half-tone image and the predetermined reference level. The signals shown in FIG. 7 apply to the case of the latter example of FIG. 5 embodiment. The same explanation as with respect to the FIG. 1 embodiment applies to the FIG. 5 embodiment, with respect to the time during which the control mode operation is performed and the portion of the photosensitive member usable for the control mode operation.

In the FIG. 5 embodiment, the intensity of the information beam is controlled by controlling the modulating and driving current H of the semiconductor laser. However, it is a possible alternative that an optical aperture stop is disposed across a proper optical path such as between the laser 9 and the polygonal mirror 10, whereby the intensity of the information beam is controlled by the aperture stop in response to the reflective image density of the visualized sample image.

In the embodiment of FIG. 5, there is one half-tone level between the white level and the black level, but two or more half-tone levels may be provided. In this case, the similar manner can be used in the control mode may be performed using a modulation signal of either one of the half-tone levels as the reference signal, whereby the intensity of the imaging beam is determined for the sake of the image forming mode. However, the most preferable reference modulation signal is one such that when the photosensitive member is exposed with the beam modulated thereby, the rate of the potential change of the photosensitive member or the rate of the image density change of the visualized image with respect to the change of the light intensity is greatest.

In the foregoing embodiments, the modulation signal is applied to the semiconductor laser driving circuit. However, it is possible that the laser is not modulated, and the laser beam is introduced into an acoustoopic element (AO element), wherein the modulation signal is applied to a driving circuit for an ultrasonic transducer connected to the acoustooptic element. In this case, the laser beam is modulated in accordance with the information to be recorded by the acoustooptic element. This is convenient in the case where a gas laser or the like is used.

In the foregoing embodiments, the laser beam is used. However, it is possible to use a number of fine light emitting diodes (LED) which are arranged in an array, wherein the individual light emitting diodes are on-off controlled in accordance with the modulation signal so as to expose to the light emitted thereby, thus forming an image. It is also possible to use a number of fine liquid crystal shutters (LCS) arranged between a light source and an electrophotographic photosensitive member, wherein the individual liquid crystal shutter in the array is driven with the modulation signal to modulate the light from the light source, so as to imagewise expose the photosensitive member, whereby an image is formed on the photosensitive member. The present invention applies to those types of apparatus.

In the foregoing embodiments, the so-called reversal development is employed wherein the toner particles are deposited on the part of the photosensitive member exposed to the light. However, the present invention is applicable to the case of positive development wherein the toner particles are deposited on the dark area that is not exposed to the imaging light (therefore, the toner is charged to the polarity which is the same as the polarity to which the photosensitive member is electrically charged by the charger 2). In this case, the foregoing embodiments apply by reading the black level as the white level. In this case, the pulse width per one picture element of the half-tone modulation signal is shorter than the ulse width for the white level.

In the foregoing embodiments, the apparatus has been described as a printer wherein the displayed image formed on the photosensitive member is transferred onto a transfer material. However, the present invention is applicable to an image forming apparatus wherein the displayed image formed on the photosensitive member in the image forming mode is moved to a display station where the formed image is displayed. In this case, it is preferable that the photosensitive member is planar in the display station, and therefore, the photosensitive member is preferably in the form of a belt.

While the invention have been described with reference to the structures disclosed herein, it is not confined to the details set forth and this application and is intended to cover such modifications or changes as may come within the purposes of the improvements or the scope of the following claims.

What is claimed is:

1. An image forming apparatus comprising:

an electrophotographic photosensitive member;

information beam generating means for generating an information beam modulated in accordance with a modulation signal containing a first density image signal having a pulse width for high image density and a second density image signal having a pulse width shorter than that of the first image density signal, wherein said photosensitive member is exposed to the beam generated by said information beam generating means; and control means for driving said information beam generating means by a reference signal having a predetermined pulse width, for detecting an image density information of an image formed by the beam modulated in accordance with the reference signal, and for controlling the pulse width of said second density image signal in response to the detection.

2. An apparatus according to claim 1, wherein said control means drives said information beam generating means with the reference signal having a pulse width shorter than the pulse width of said first density image signal.

3. An apparatus according to claim 2, wherein said control means detects a surface potential of an electrostatic latent image formed on said photosensitive member with the beam modulated in accordance with the reference signal.

4. An apparatus according to claim 2, wherein said control means detects an image density of a dislayed image formed with the beam modulated in accordance with the reference signal.

5. Image forming apparatus comprising:
an electrophotographic photosensitive member;
information beam generating means for generating an information beam modulated in accordance with a modulation signal containing a first density image signal having a pulse width for high image density and a second density image signal having a pulse width shorter than that of the first image density signal, wherein said photosensitive member is epxosed to the beam generated by said information beam generating means; and
control means for driving said information beam generating means by a reference signal having a predetermined pulse width shorter than the pulse width of said first density image signal, for detecting an image density information of an image formed by the beam modulated in accordance with the reference signal, and for controlling an intensity of the information beam in response to the detection.

6. Apparatus according to claim 5, wherein said control means detects a surface potential of an electrostatic latent image formed on said photosensitive member with the beam modulated in accordance with the reference signal.

7. Apparatus according to claim 5, wherein said control means detects an image density of a developed image formed with the beam modulated in accordance with the reference signal.

8. Apparatus according to claim 5, wherein said control means applies a reference driving current having a predetermined level to said information beam generating means when driving said information beam generating means in accordance with the reference signal, and controls a level of the driving current applied to said information beam generating means in accordance with the detection.

* * * * *

UNITED STATES PATENT AND TRADEMARK OFFICE
CERTIFICATE OF CORRECTION

PATENT NO. : 4,709,250

DATED : November 24, 1987

INVENTOR(S) : AKIHIKO TAKEUCHI

Page 1 of 3

It is certified that error appears in the above-identified patent and that said Letters Patent is hereby corrected as shown below:

IN THE DRAWINGS

Figure 1

"VARABLE" should read --VARIABLE--.

COLUMN 1

Line 23, "and" should read --a--.
Line 25, "picuture" should read --picture--.

COLUMN 2

Line 42, "tranferred" should read --transferred--.
Line 44, "a" should read --an--.

COLUMN 3

Line 43, "switch in" should read --switch S3 is--.

COLUMN 4

Line 11, "followind" should read --following--.
Line 40, "cicuit 18," should read --circuit 18,--.

UNITED STATES PATENT AND TRADEMARK OFFICE
CERTIFICATE OF CORRECTION

PATENT NO. : 4,709,250

DATED : November 24, 1987

INVENTOR(S) : AKIHIKO TAKEUCHI

It is certified that error appears in the above-identified patent and that said Letters Patent is hereby corrected as shown below:

COLUMN 5

Line 34, "$\delta$ characteristics" should read --$\gamma$ characteristics--.

COLUMN 6

Line 65, "desnity" should read --density--.

COLUMN 7

Line 7, "in" should read --is--.
Line 31, "to is" should read --to--.
Line 50, "peformed" should read --performed--.

COLUMN 8

Line 48, "sued" should read --used--.

COLUMN 9

Line 61, "driving" should read --driver--.

UNITED STATES PATENT AND TRADEMARK OFFICE
CERTIFICATE OF CORRECTION

PATENT NO. : 4,709,250          Page 3 of 3
DATED : November 24, 1987
INVENTOR(S) : AKIHIKO TAKEUCHI It is certified that error appears in the above-identified patent and that said Letters Patent is hereby corrected as shown below:

COLUMN 10

Line 22, "the" should be deleted.
        Line 36, "an" should read --and--.

COLUMN 11

Line 49, "may" should read --and may--.

COLUMN 12

Line 31, "ulse" should read --pulse--.
        Line 45, "and" should be deleted.

COLUMN 13

Line 12, "dislayed" should read --displayed--.

Signed and Sealed this

Tenth Day of May, 1988

*Attest:*

DONALD J. QUIGG

*Attesting Officer*      *Commissioner of Patents and Trademarks*